(12) United States Patent
Kawaoka

(10) Patent No.: US 12,739,333 B2
(45) Date of Patent: Sep. 15, 2026

(54) IMAGE READING DEVICE WITH DOCUMENT LIFT MOVING UP AND DOWN

(71) Applicant: KYOCERA Document Solutions Inc., Osaka (JP)

(72) Inventor: Ryo Kawaoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 286 days.

(21) Appl. No.: 18/667,169

(22) Filed: May 17, 2024

(65) Prior Publication Data

US 2024/0388667 A1 Nov. 21, 2024

(30) Foreign Application Priority Data

May 18, 2023 (JP) ................................ 2023-082012

(51) Int. Cl.
*H04N 1/00* (2006.01)

(52) U.S. Cl.
CPC ....... *H04N 1/00694* (2013.01); *H04N 1/0062* (2013.01); *H04N 1/00649* (2013.01); *H04N 1/00689* (2013.01); *H04N 1/00702* (2013.01); *H04N 2201/0081* (2013.01)

(58) Field of Classification Search
None
See application file for complete search history.

(56) References Cited

U.S. PATENT DOCUMENTS

2011/0058881 A1* 3/2011 Mitamura ............ H04N 1/0057 400/582
2018/0208420 A1* 7/2018 Link .................. H04N 1/00323

FOREIGN PATENT DOCUMENTS

EP 1842812 A2 * 10/2007 ............... B65H 1/14
JP 2006056684 A 3/2006

* cited by examiner

*Primary Examiner* — Fan Zhang
(74) *Attorney, Agent, or Firm* — IP Business Solutions, LLC.

(57) ABSTRACT

In an image reading device, an object intrusion detecting device includes a rod-like member disposed along a widthwise direction of a document tray and detects that the rod-like member has been pushed up to a predetermined position in a height direction. When the object intrusion detecting device detects that the rod-like member has been pushed up to the predetermined abnormal position in the height direction, the controller determines that an object intrusion has occurred.

6 Claims, 4 Drawing Sheets

1
1a
1b
2
3
3a
3a1
4
11
12
13
14
21
22
23
23a
23b

IMAGE READING DEVICE WITH DOCUMENT LIFT MOVING UP AND DOWN

INCORPORATION BY REFERENCE

This application claims priority to Japanese Patent Application No. 2023-082012 filed on May 18, 2023, the entire contents of which are incorporated by reference herein.

BACKGROUND

The present disclosure relates to image reading devices.

An image forming apparatus includes an automatic document feeder that includes: a vertically movable document tray; and a sheet feed roller capable of feeding a document sheet present on the document tray. The sheet feed roller is disposed above the document tray and provided movably in a certain vertical range. Therefore, when in contact with the document tray or a document sheet on the document tray, the sheet feed roller is vertically movable by following the vertical movement of the document tray or the top surface of the document sheet on the document tray. The image forming apparatus further includes a pressure sensor that detects an upward pressure against the sheet feed roller. When, in a state where the sheet feed roller is in contact with the document tray or a document sheet put in place on the document tray, a document sheet is newly introduced onto the document tray and abuts against the sheet feed roller and the pressure sensor thus detects a pressure applied on the sheet feed roller by the fed document sheet, the image forming apparatus allows the document tray to move downward and thus allows the newly introduced document sheet to be put in place on the document tray.

SUMMARY

A technique improved over the aforementioned technique is proposed as one aspect of the present disclosure.

An image reading device according to an aspect of the present disclosure includes an image sensor, a document tray, a conveying device, a lifting device, an object intrusion detecting device, and a controller. The image sensor reads a document image from a document sheet. The document tray is a place where the document sheet is to be placed. The conveying device conveys the document sheet toward the image sensor. The lifting device lifts the document tray up and down. The object intrusion detecting device is disposed above the document tray. The controller includes a processor. The object intrusion detecting device includes a rod-like member disposed along a widthwise direction of the document tray and detects that the rod-like member has been pushed up to a predetermined position in a height direction. When the processor executes a control program and, thus, the object intrusion detecting device detects that the rod-like member has been pushed up to the predetermined position in the height direction, the controller determines that an object intrusion has occurred.

DETAILED DESCRIPTION

Hereinafter, a description will be given of an embodiment of the present disclosure with reference to the drawings.

Figure 1:
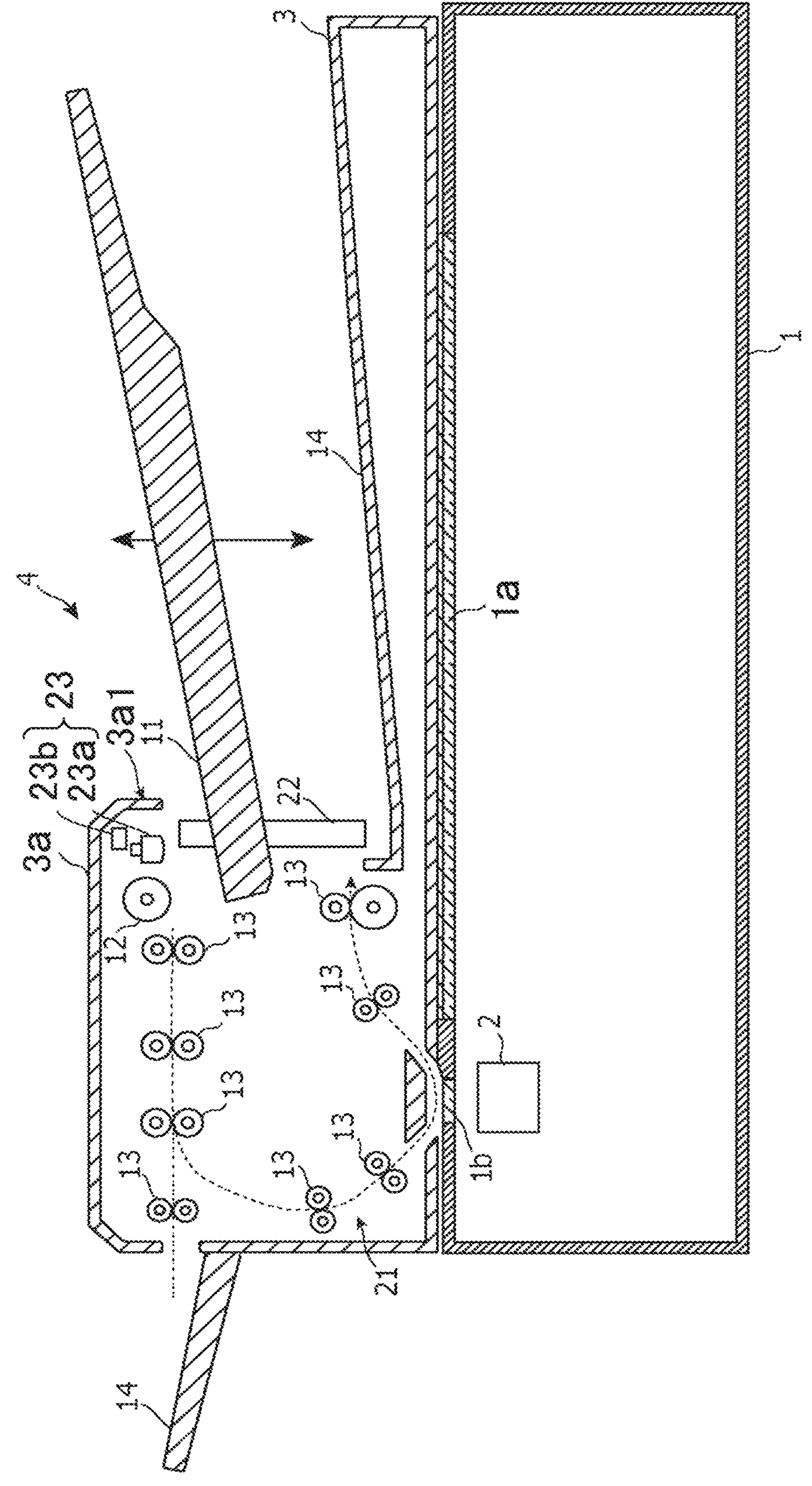
FIG. 1 is a side view showing an internal structure of an image reading device according to an embodiment of the present disclosure.

FIG. 1 is a side view showing an internal structure of an image reading device according to an embodiment of the present disclosure. An image reading device shown in FIG. 1 is a scanner, a copier, a facsimile machine, a multifunction peripheral or another like device.

The image reading device shown in FIG. 1 includes a device body 1, original glass plates 1*a* and 1*b* disposed at the top surface of the device body 1, an image sensor 2, and a document cover 3. The document cover 3 includes an automatic document feeder 4.

The original glass plate 1*a* is a transparent member for use in reading a document image of an original document (a document sheet) without the use of the automatic document feeder 4, in which case the original document is placed on the original glass plate 1*a*. On the other hand, the original glass plate 1*b* is a transparent member for use in reading a document image of an original document while automatically conveying the original document by the automatic document feeder 4, in which case the original document passes on the original glass plate 1*b*.

The image sensor 2 reads a document image from a document sheet (an original document). Specifically, the image sensor 2 is a sensor that, in reading a document image of an original document while automatically conveying the original document by the automatic document feeder 4, optically reads the document image of the original document passing through a predetermined image reading position in a conveyance path for original documents. The image sensor 2 reads the document image on a line-by-line basis. The image sensor 2 includes a light source (such as a light-emitting diode) and a light-receiving element (such as a line sensor), wherein the light source emits light and the light-receiving element detects reflected light through the original glass plate 1*a* or 1*b* from the original document and outputs an electrical signal corresponding to the light intensity of the reflected light. A controller 23 to be described hereinafter receives the electrical signal and generates, based on this electrical signal, a document image (i.e., image data on the document image) of the original document.

The document cover 3 is a member capable of surface contact with the original glass plate 1*a* and provided pivotally with respect to the original glass plate 1*a*. The document cover 3 holds an original document in close contact with the original glass plate 1*a* and prevents environmental light from entering the interior of the image reading device through the original glass plates 1*a*, 1*b* during image reading. The automatic document feeder 4 includes: a document tray 11 on which document sheets are to be placed; and a conveying device 21 that conveys a document sheet toward the image sensor 2. The automatic document feeder 4 uses the conveying device 21 to allow the document sheets placed on the document tray 11 to pass on the original glass plate 1*b* sheet by sheet and then allow the document sheet to be ejected on an ejection tray 14. Specifically, the conveying device 21 includes a sheet feed roller 12 and conveyance rollers 13, wherein the sheet feed roller 12 feeds a document sheet and the conveyance rollers 13 conveys the document sheet. The sheet feed roller 12 comes into contact with one of the document sheets placed on the document tray 11 and feeds the document sheets sheet by sheet.

The image sensor 2 can be changed in its image reading position by an unshown drive device. In reading a document image of an original document with the use of the automatic document feeder 4, the image reading position of the image sensor 2 is set at a location where the original document passes on the original glass plate 1*b*, in which case the image sensor 2 optically reads the document image of the original document being conveyed by the automatic document feeder 4 at the time when the original document passes on the original glass plate 1*b*. Here, the image sensor 2 is a color image sensor that reads a document image composed of a plurality of colors, such as RGB, at different image reading positions in the direction of sheet conveyance for different colors. In this embodiment, a CIS (contact image sensor) is used as the image sensor 2. In reading a document image of an original document with the use of the automatic document feeder 4, the image sensor 2 is positioned just below the original glass plate 1*b*.

The sheet feed roller 12 and the conveyance rollers 13 are driven by a drive device, such as a motor, and convey an original document along the conveyance path. The ejection tray 14 is a tray on which document sheets falling out of the terminal end of the conveyance path are to be piled up.

The image reading device shown in FIG. 1 further includes: a lifting device 22 that lifts the document tray 11 up and down in an existing method; and an object intrusion detecting device 23 disposed above the document tray 11.

Figure 2:
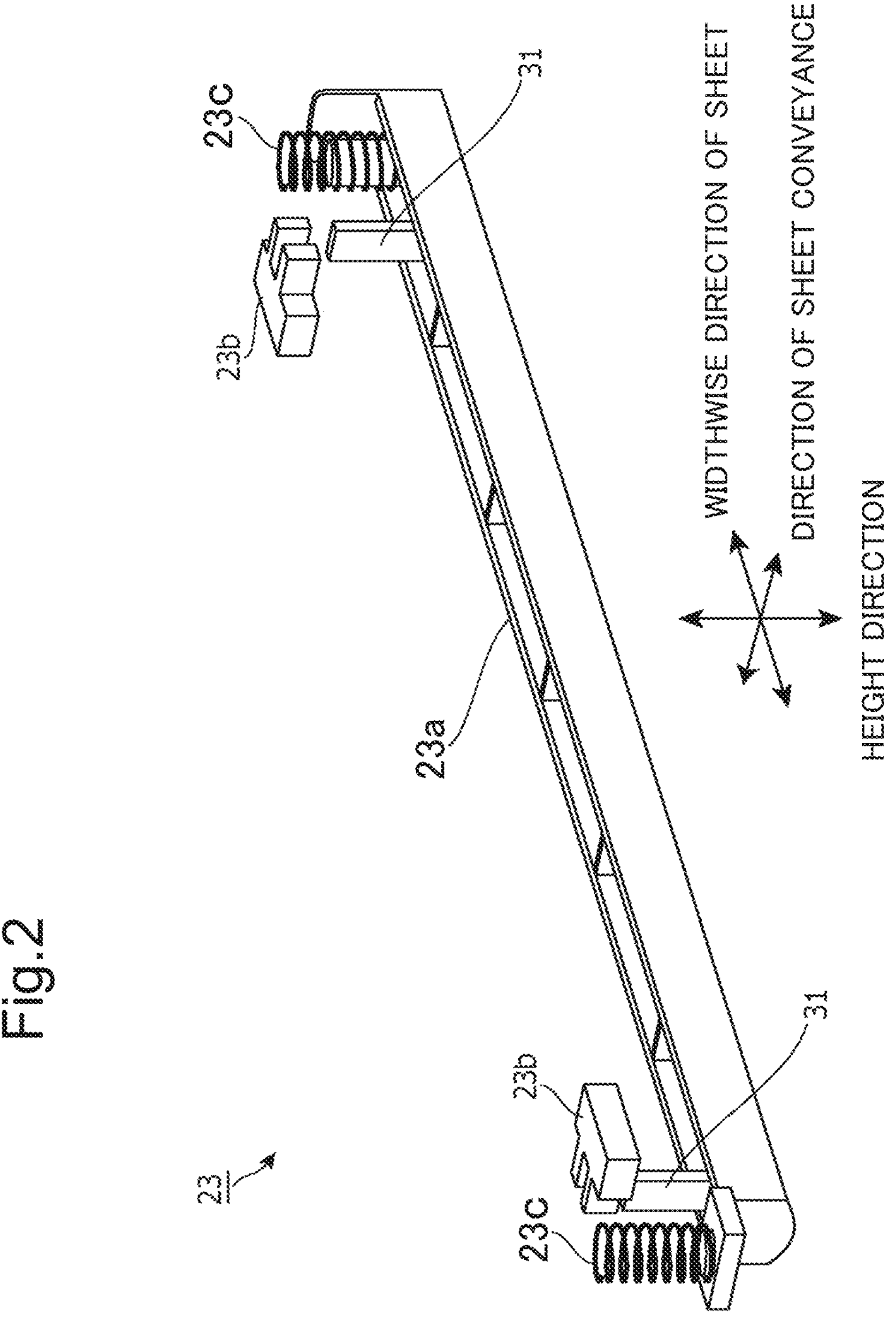
FIG. 2 is a perspective view showing an example of an object intrusion detecting device 23 in the image reading device shown in FIG. 1.
Figure 3:
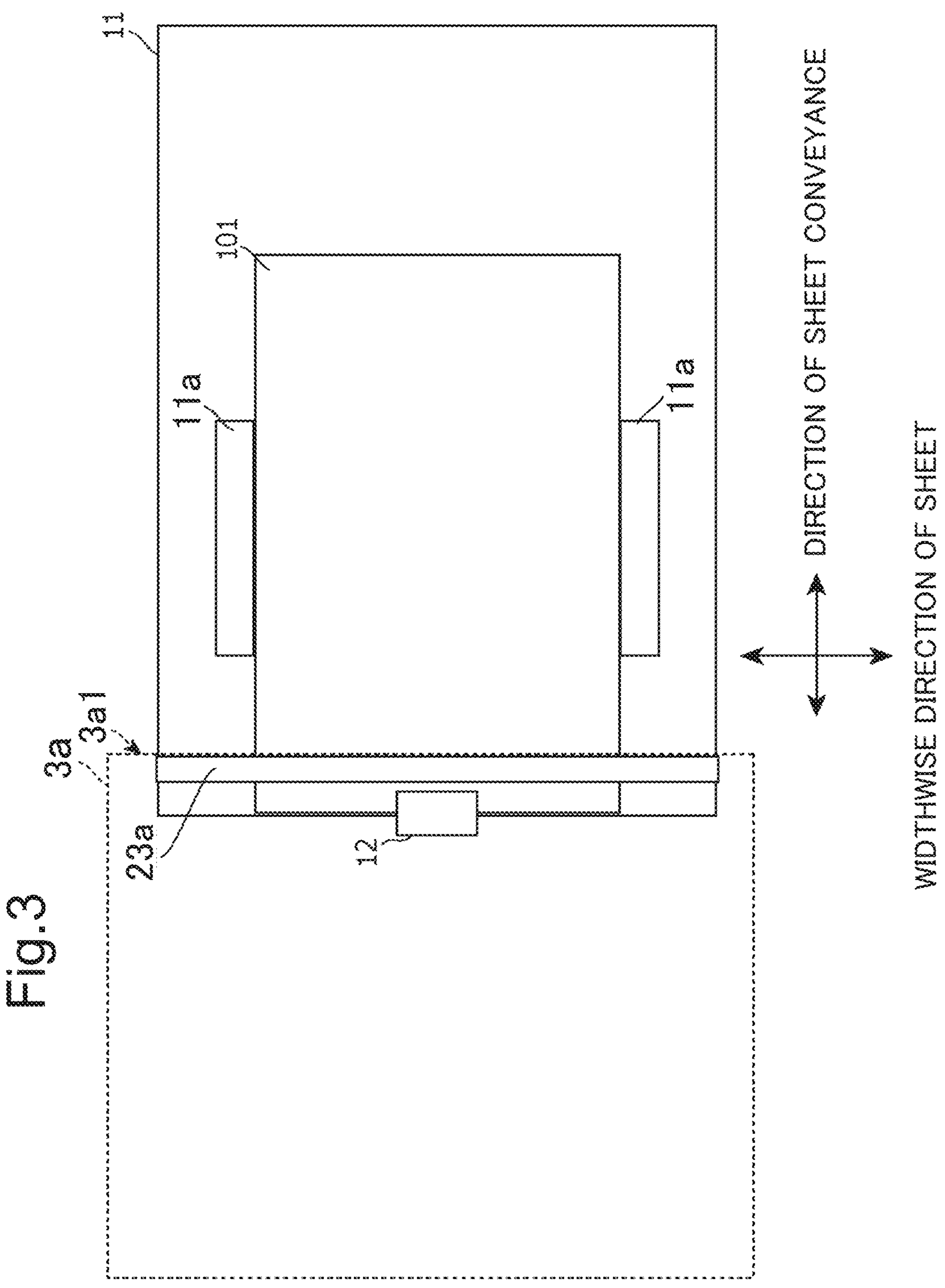
FIG. 3 is a top view showing the image reading device shown in FIG. 1.

FIG. 2 is a perspective view showing an example of an object intrusion detecting device 23 in the image reading device shown in FIG. 1. FIG. 3 is a top view showing the image reading device shown in FIG. 1.

As shown in FIGS. 1 and 2, the object intrusion detecting deice 23 includes a rod-like member 23*a* and detects that the rod-like member 23*a* has been pushed up to a predetermined abnormal position in the height direction. As shown in FIG. 2, the rod-like member 23*a* is disposed along the widthwise direction of the document tray 11 and has at least a dimension longer than the sheet feed roller 12 in the widthwise direction. In this embodiment, the rod-like member 23*a* has approximately the same dimension as the width of the document tray 11. Furthermore, the object intrusion detecting device 23 is covered with a top cover 3*a* and the rod-like member 23*a* is disposed between the sheet feed roller 12 and a side end surface 3*al* of the top cover 3*a*.

In this embodiment, the object intrusion detecting device 23 further includes an optical sensor 23*b* and detects, with the optical sensor 23*b*, that the rod-like member 23*a* has been pushed up to the abnormal position in the height direction.

The object intrusion detecting device 23 further includes elastic members 23*c*, such as springs (compression springs). The elastic members 23*c* are each anchored at one end to the top cover 3*a* and anchored at the other end to the rod-like member 23*a*. Thus, in a state where the rod-like member 23*a* is not in contact with any foreign object, the elastic members 23*c* allow the rod-like member 23*a* to be suspended therefrom and located at a predetermined normal position in the height direction. The rod-like member 23*a* is disposed at a height where it is kept from coming in contact with a document sheet being fed by the sheet feed roller 12.

Specifically, the optical sensor 23*b* is a PI (photo interruption) sensor that includes a light-emitting part and a light-receiving part. When the rod-like member 23*a* is pushed up to the abnormal position in the height direction (a position higher than the normal position in the height direction), a projection 31 provided on the top surface of the rod-like member 23*a* blocks light emitted from the light-emitting part toward the light-receiving part to reduce the intensity of light received by the light-receiving part. Therefore, when the rod-like member 23*a* is pushed up to the abnormal position in the height direction, the level of the output signal from the optical sensor 23*b* changes.

Furthermore, in this embodiment, the object intrusion detecting device 23 includes at least two optical sensors 23*b*. One of the two optical sensors 23*b* detects that one end of the rod-like member 23*b* has been pushed up to the above-described abnormal position. The other of the two optical sensors 23*b* detects that the other end of the rod-like member 23*b* has been pushed up to the abnormal position. In this embodiment, for example, as shown in FIG. 2, the one optical sensor 23*b* is disposed in front of the rod-like member 23*a* (on the upstream side thereof in the direction of sheet conveyance) and the other optical sensor 23*b* is disposed behind the rod-like member 23*a* (on the downstream side thereof in the direction of sheet conveyance).

As shown in FIG. 3, the document tray 11 includes a document guide 11*a* that positions a document sheet 101 in the middle of the document tray 11 in the widthwise direction, and, thus, the sheet feed roller 12 feeds the document sheet 101 while being in contact with the midportion of the document sheet 101 in the widthwise direction.

Figure 4:
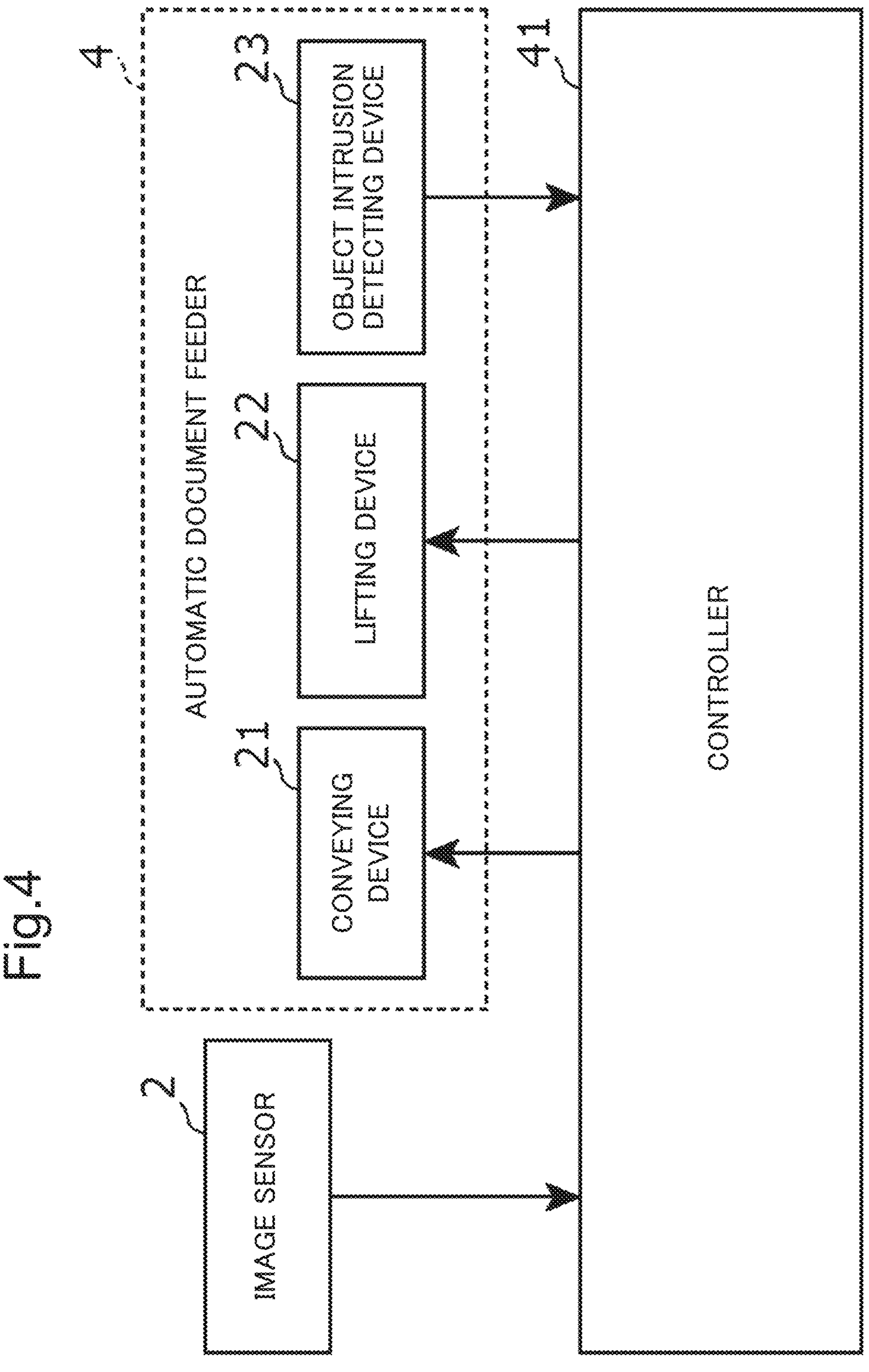
FIG. 4 is a block diagram showing an electrical configuration of the image reading device shown in FIG. 1.

FIG. 4 is a block diagram showing an electrical configuration of the image reading device shown in FIGS. 1 and 2. As shown in FIG. 4, the image reading device further includes a controller 41. The controller 41 includes a CPU, an ASIC (application specific integrated circuit) or so on as a processor for executing programs, controls the image sensor 2 and the automatic document feeder 4 (such as the conveying device 21 and the lifting device 22) to execute reading of an image of a document sheet, and thus acquires image data on the image (the document image) of the document sheet. When the processor operates in accordance with a control program stored in a ROM built in the controller 41, a non-volatile memory or an unshown storage device consisting of an HDD, an SSD or the like, the controller 41 performs various operation controls for the image reading device, inclusive of the automatic document feeder 4.

Furthermore, when the object intrusion detecting device detects that the rod-like member 23*a* has been pushed up to the abnormal position in the height direction, the controller 41 determines that an intrusion of a foreign object or the like on the document tray 11 has occurred. Specifically, the controller 41 determines, based on the output signal (the level thereof) from the optical sensor 23*b*, whether or not an object intrusion has occurred. Therefore, when, as described above, the rod-like member 23*a* is pushed up to the abnormal position in the height direction, the level of the output signal from the optical sensor 23*b* changes. When the projection 31 on the top surface of the rod-like member 23*a* blocks light emitted from the light-emitting part toward the light-receiving part to decrease the intensity of light received by the light-receiving part to a predetermined value, the controller 41 determines that an intrusion of a foreign object or the like on the document tray 11 has occurred. When the intensity of light received by the light-receiving part is larger than the predetermined value, the controller 41 determines that no intrusion of a foreign object or the like on the document tray 11 has occurred.

In this embodiment, at least two optical sensors 23*b* are provided for the adjustment to both ends of the rod-like member 23*a* and, when at least one of the output signals from the two optical sensors 23*b* indicates that the rod-like member 23*a* has been pushed up to the abnormal position, the controller 41 determines that an object intrusion has occurred. Thus, even when an object intrusion occurs at a location on the document tray 11 away from the middle thereof in the widthwise direction and, thus, the rod-like member 23*a* is pushed up in an inclined state, the object intrusion can be properly detected.

Furthermore, when, as described above, the controller 41 determines that an object intrusion has occurred, it stops the operation of the lifting device 22 or allows the lifting device 22 to move the document tray 11 down.

Next, a description will be given of the operation of the image reading device.

According to a user's operation on an unshown operation panel or the like, the controller 41 executes reading of a document image of an original document using the automatic document feeder 4 in the following manner.

First, when detecting, with an unshown sensor or the like, that a document sheet has been placed on the document tray 11, the controller 41 controls the lifting device 22 to move up the document tray 11 from a predetermined initial position. In doing so, the controller 41 monitors, based on the output signals from the optical sensors 23*b* of the object intrusion detecting device 23, whether or not an object intrusion has occurred. When determining that an object intrusion has occurred, the controller 41 controls the lifting device 22 to stop the upward movement of the document tray 11 and stop reading of a document image of the document sheet.

Thereafter, when no object intrusion occurs during upward movement of the document tray 11, the controller 41 starts the operation of the image sensor 2 and controls the automatic document feeder 4 to start the sheet-by-sheet conveyance of document sheets 101 from the document tray 11. In the automatic document feeder 4, the conveyance rollers 13 convey, along the conveyance path, the document sheet 101 fed from the document tray 11 by the sheet feed roller 12. Then, under the control of the controller 41, when the document sheet 101 reaches the image reading position, the image sensor 2 reads the document image of the document sheet 101 line by line. Thereafter, under the control of the controller 41, the conveyance rollers 13 convey the document sheet 101 and eject it to the ejection tray 14. Furthermore, under the control of the controller 41, the document image obtained in the above manner is stored as an image data file into an unshown storage device, sent as an image data file to an unshown external device or printed on an unshown printing device.

When the reading of the document image is finished and no document sheet remains on the document tray 11, the controller 41 controls the lifting device 22 to move down the document tray 11 to the initial position.

As thus far described, in the above embodiment, the object intrusion detecting device 23 includes the rod-like member 23*a* disposed along the widthwise direction of the document tray 11 and detects that the rod-like member 23*a* has been pushed up to the abnormal position in the height direction. When the object intrusion detecting device 23 detects that the rod-like member 23*a* has been pushed up to the abnormal position in the height direction, the controller 41 determines that an object intrusion has occurred.

As seen from the above, contact of a foreign object with the rod-like member 23*a* can be made likely and can be properly detected. Therefore, reading of a document image can be smoothly performed.

Generally, when in an image forming apparatus a foreign object gets caught between a sheet feed roller and a document tray, the document tray is moved down. However, because the sheet feed roller is disposed in the middle of the document tray in the widthwise direction thereof (in the direction orthogonal to the direction of conveyance of the document sheet), if a foreign object (including a user's finger) gets caught on a region of the document tray away from the sheet feed roller, the foreign object cannot be detected, the document tray stays in an upward position, and, therefore, it is difficult any longer to smoothly read a document image.

Unlike the general image forming apparatus, in the above embodiment, a foreign object can be properly detected as described above and, therefore, a document image can be smoothly read.

Various changes and modifications to the above embodiment will become apparent to those skilled in the art. Such changes and modifications may be made without departing from the spirit and scope of the subject matter and without diminishing the intended advantages. In other words, such changes and modifications are intended to fall within the scope of the claims.

For example, in the above embodiment, until the document tray 11 moves down after the upward movement of the document tray 11, the controller 41 may monitor, based on the output signals of the optical sensors 23*b* of the object intrusion detecting device 23, whether or not an object intrusion has occurred.

INDUSTRIAL APPLICABILITY

The present disclosure is applicable to, for example, image reading devices.

While the present disclosure has been described in detail with reference to the embodiments thereof, it would be apparent to those skilled in the art that the various changes and modifications may be made therein within the scope defined by the appended claims.

What is claimed is:

1. An image reading device comprising:

an image sensor that reads a document image from a document sheet;

a document tray on which the document sheet is to be placed;

a conveying device that conveys the document sheet toward the image sensor;

a lifting device that lifts the document tray up and down;

an object intrusion detecting device disposed above the document tray; and a controller including a processor;

wherein the object intrusion detecting device comprises a rod-like member disposed along a widthwise direction of the document tray and detects that the rod-like member has been pushed up to a predetermined position in a height direction, and when the processor executes a control program and, thus, the object intrusion detecting device detects that the rod-like member has been pushed up to the predetermined position in the height direction, the controller determines that an object intrusion has occurred.

2. The image reading device according to claim 1, wherein when determining that the object intrusion has occurred, the controller stops operation of the lifting device or allows the lifting device to move the document tray down.

3. The image reading device according to claim 1, wherein the object intrusion detecting device further comprises an optical sensor, the optical sensor detects that the rod-like member has been pushed up to the predetermined position in the height direction, and the controller determines, based on an output signal from the optical sensor, whether or not the object intrusion has occurred.

4. The image reading device according to claim 3, wherein the object intrusion detecting device comprises at least two optical sensors, one of the two optical sensors detects that one end of the rod-like member in the widthwise direction of the document tray has been pushed up to the predetermined position, the other of the two optical sensors detects that the other end of the rod-like member in the widthwise direction of the document tray has been pushed up to the predetermined position, and when at least one of the output signals from the two optical sensors indicates that the rod-like member has been pushed up to the predetermined position in the height direction, the controller determines that the object intrusion has occurred.

5. The image reading device according to claim 4, wherein one of the two optical sensors is disposed on an upstream side of the rod-like member in a direction of conveyance of the document sheet and the other of the two optical sensors is disposed on a downstream side of the rod-like member in the direction of conveyance of the document sheet.

6. The image reading device according to claim 1, wherein the conveying device comprises a sheet feed roller capable of coming into contact with the document sheet and feeding the document sheet, and the rod-like member is disposed at a height where the rod-like member is kept from coming in contact with the document sheet being fed by the sheet feed roller.

* * * * *